United States Patent
Sasa

(10) Patent No.: US 7,417,075 B2
(45) Date of Patent: Aug. 26, 2008

(54) CATIONICALLY POLYMERIZABLE COMPOSITION, ACTINIC RADIATION CURABLE INK-JET INK, AND PRODUCTION METHOD OF CATIONICALLY POLYMERIZABLE COMPOSITION

(75) Inventor: Nobumasa Sasa, Sayama (JP)

(73) Assignee: Konica Minolta Medical & Graphic, Inc. (JP)

( * ) Notice: Subject to any disclaimer, the term of this patent is extended or adjusted under 35 U.S.C. 154(b) by 352 days.

(21) Appl. No.: 11/209,099

(22) Filed: Aug. 22, 2005

(65) Prior Publication Data

US 2006/0074138 A1    Apr. 6, 2006

(30) Foreign Application Priority Data

Aug. 26, 2004 (JP) ............... P2004-246414

(51) Int. Cl.
 C08G 65/02    (2006.01)
 C08G 65/04    (2006.01)
 C08G 65/10    (2006.01)
 C08G 65/18    (2006.01)

(52) U.S. Cl. ............ 522/168; 522/170; 522/25; 522/31; 522/27; 522/28; 522/29; 522/64; 522/66; 528/409; 528/413; 528/416; 528/417; 528/418; 528/421

(58) Field of Classification Search ........ 522/168, 522/170, 25, 31, 27, 28, 29, 64, 66; 528/409, 528/413, 416, 417, 418, 421
See application file for complete search history.

(56) References Cited

U.S. PATENT DOCUMENTS

| 7,169,446 B2 * | 1/2007 | Nishizeki et al. ......... 427/466 |
| 7,244,473 B2 * | 7/2007 | Takabayashi et al. ...... 427/466 |
| 2003/0191256 A1 * | 10/2003 | Hayashi ................ 526/204 |

FOREIGN PATENT DOCUMENTS

| JP | 08-143806 | 6/1996 |
| JP | 08-283320 | 10/1996 |
| JP | 2000-186079 | 7/2000 |
| JP | 2000-327672 | 11/2000 |
| JP | 2003-252979 | 9/2003 |
| JP | 2003-252979 A | 9/2003 |

OTHER PUBLICATIONS

European Search Report for European Application No. 05780222.5—2102 mailed Aug. 6, 2007.

* cited by examiner

*Primary Examiner*—Susan W Berman
(74) *Attorney, Agent, or Firm*—Cantor Colburn LLP

(57) ABSTRACT

A cationically polymerizable composition containing a cationically polymerizable compound and a cationic polymerization initiator, wherein a total content of a cationic compound, a metal compound and a strong acid compound contained in the cationically polymerizable composition is in the range of 1 to 500 ppm by weight based on the total weight of the cationically polymerizable composition.

8 Claims, No Drawings

CATIONICALLY POLYMERIZABLE COMPOSITION, ACTINIC RADIATION CURABLE INK-JET INK, AND PRODUCTION METHOD OF CATIONICALLY POLYMERIZABLE COMPOSITION

This application is based on Japanese Patent Application No. 2004-246414 filed on Aug. 26, 2004, in Japanese Patent Office, the entire content of which is hereby incorporated by reference.

TECHNICAL FIELD

The present invention relates to cationically polymerizable compositions which exhibit excellent storage stability and excellent curability, an actinic radiation curable ink-jet ink, and a production method of cationically polymerizable compositions.

BACKGROUND

Heretofore, known as quick drying printing ink have been ink compositions for actinic radiation curable ink-jet ink (hereinafter also referred to as ink compositions), which undergo polymerization via exposure to actinic radiation such as ultraviolet radiation, resulting in ink curing. The above radically polymerizable ink compositions have exhibited problems in which curing is retarded in the presence of oxygen.

In recent years, proposed have been ink compositions which undergo cationic polymerization via exposure to actinic radiation. Proposed as above cationically polymerizable ink compositions have been those which are composed of oxetane compounds, cationic photopolymerization initiators, and pigments, and if desired, to which epoxy compounds are added (refer, for example, to Patent Document 1). A cationic polymerization reaction is initiated in the presence of cations generated from cationic polymerization initiators via exposure to ultraviolet radiation. Consequently, polymerization is not hindered by oxygen, and specifically, no practical limit exists in which it is inevitable to perform the reaction in an inactive ambience. Advantages are exhibited in which it is possible to quickly perform the reaction in air and to achieve excellent polymerization.

However, when cationically polymerizable compounds such as oxetane compounds or epoxy compounds are stored for an extended period of time in a state in which cationic polymerization initiators are incorporated, cations may be formed from the above cationic polymerization initiators even though ultraviolet radiation is shielded. Thereby, problems have occurred in which cationically polymerizable compounds are subjected to polymerization initiation, resulting in an increase in viscosity and gelling.

Proposed as one method to overcome the drawbacks described above is a method (refer, for example, to Patent Document 2) in which one or at least two types of guanidine based compounds, thiazole based compounds, benzothiazole based compounds, thiazole carboxylic acid based compounds, sulfenamide based compounds, thiourea based compounds, imidazole based compounds, benzimidazole based compounds, and alkylphenyl sulfide based compounds are incorporated in a composition composed of cationic polymerization catalysts and cationically polymerizable organic materials, both being essential components, whereby it is possible to improve stability at room temperature (being pot life) of the above compositions.

Further, methods are proposed (refer, for example, to Patent Documents 3-5) in which basic compounds such as hydroxides or carbonates of alkali metals or alkali earth metals, basic inorganic compounds such as alcolates, basic organic compounds such as amine or other nitrogen containing basic compounds, or water are incorporated in oxetane compounds, whereby storage stability is improved without degrading ring opening polymerization properties.

However, when cationic polymerization initiators are incorporated in cationically polymerizable compounds, the addition of the basic compounds, described above, does not sufficiently improve storage stability. Specifically, in the case of a mixed system in which cationically polymerizable compounds are blended with oxetane compounds and alicyclic epoxy compounds, gel is formed due to the fact that the reactivity of the oxetane compound is markedly enhanced in the presence of cationic polymerization initiators, compared to the case in which oxetane compounds are individually present. As a result, at present, it is not possible to obtain sufficient improved effects for storage stability.

Further, in order to overcome the drawbacks as described above, an increase in the added amount of the above guanidine based compounds and basic compounds overcomes the drawback of gelling, while a further drawback in which curability is degraded occurs, whereby it has been difficult to simultaneously achieve both storage stability and curability. Further, some of guanidine based compounds and basic compounds, described above, are harmful. In view of adaptability to environment, it is not preferable to incorporate such harmful substances in a large amount in composition.

(Patent Document 1) JP A No. 8-143806 (claims and examples)
(Patent Document 2) JP-A No. 8-283320 (claims and examples)
(Patent Document 3) JP-A No. 2000-186079 (claims and examples)
(Patent Document 4) JP-A No. 2000-327672 (claims and examples)
(Patent Document 5) JP-A No. 2003-252979 (claims and examples)

SUMMARY

In view of the foregoing problems, the present invention was achieved. An object of the present invention is to provide a cationically polymerizable composition and an actinic radiation curable ink-jet ink, which makes it possible to secure storage stability over an extended period of time without degrading curability of the catatonically polymerizable compound incorporating cationic polymerization initiators, results in ejection stability of the ink, and exhibits excellent environment adaptability and production adaptability, as well as to provide a production method of the cationic polymerizable composition.

It is possible to achieve the above object of the present invention employing the following embodiments.

(1) An aspect of the present invention includes a cationically polymerizable composition containing a cationically polymerizable compound and a cationic polymerization initiator, wherein a total content of a cationic compound, a metal compound and a strong acid compound contained in the cationically polymerizable composition is in the range of 1 to 500 ppm by weight based on the total weight of the cationically polymerizable composition.

(2) Another aspect of the present invention includes the cationically polymerizable composition of the above-described item 1, wherein the total content of a cationic compound, a metal compound and a strong acid compound contained in the cationically polymerizable composition is in the range of 10 to 100 ppm by weight based on the total weight of the cationically polymerizable composition.

(3) Another aspect of the present invention includes the cationically polymerizable composition of the above-described item 1, wherein each of the cationic compound, the metal compound and the strong acid compound contains an element selected from the group consisting of B, F, Na, Mg, Al, P, S, Cl, K, Ca, Cu, Br, Ag, Sn, Sb, As and W.

(4) Another aspect of the present invention includes the cationically polymerizable composition of the above-described item 1, wherein the cationically polymerizable compound is a alicyclic epoxy compound or an oxetane compound.

(5) Another aspect of the present invention includes the cationically polymerizable composition of the above-described item 1, further containing water in an amount of 1 to 10 weigh % based on the total weight of the cationically polymerizable composition.

(6) Another aspect of the present invention includes the cationically polymerizable composition of the above-described item 1, further containing a water evaporation inhibiting agent.

(7) Another aspect of the present invention includes the cationically polymerizable composition of the above-described item 1, wherein a viscosity of the cationically polymerizable composition is 5 to 50 mPa·s at 23° C.

(8) Another aspect of the present invention includes an actinic radiation curable ink-jet ink containing the cationically polymerizable composition of the above-described item 1.

(9) Another aspect of the present invention includes a method of producing the cationically polymerizable composition of the above-described item 1 comprising:

mixing a cationically polymerizable compound and a cationic polymerization initiator to obtain a mixture which contains a strong acid compound as an impurity; and allowing the mixture to an adsorption treatment using an basic adsorbent so as to control a content of the strong acid compound in the range of 1 to 500 ppm by weight based on the total weight of the mixture.

According to an embodiment of the present invention, it is possible to provide cationically polymerizable compositions and actinic radiation curable ink-jet ink which are capable of securing storage stability over an extended period of time without degrading curability of cationically polymerizable compounds incorporating cationic polymerization initiators, result in ejection stability as ink, and exhibit excellent environment adaptability and production adaptability, as well as to provide a production method of the cationically polymerizable composition.

PREFERRED EMBODIMENTS OF THE INVENTION

Preferred embodiments of the present invention will now be described, however, the present invention is not limited thereto.

In view of the foregoing, the present inventors conducted diligent investigation and discovered that it was possible to realize a cationically polymerizable composition, incorporating cationically polymerizable compounds and cationic polymerization initiators, which is capable of securing storage stability over an extended period of time without degrading curability of cationically polymerizable compounds incorporating cationic polymerization initiators, employing cationically polymerizable composition in which the total content of cationic compounds, metal compounds, and high acidic compounds other than the above cationically polymerizable compounds and cationic polymerization initiators is 1-500 ppm, and which also exhibits environmental adaptability and production adaptability, whereby the present invention was achieved.

The present invention will now be detailed.

The cationically polymerizable composition of the present invention incorporates at least a cationically polymerizable compound and a cationic polymerization initiator.

Cationically polymerizable compounds usable in the present invention are not particularly limited, and examples include cationically polymerizable vinyl compounds and lactones, as well as cyclic ethers. Listed as cationically polymerizable vinyl compounds are styrene and vinyl ethers, while listed as cyclic ethers are epoxy compounds, and oxetane compounds as well as, spiro orthoesters, bicyclic orthoesters, and cyclic carbonates.

Epoxy compounds usable in the present invention refer to compounds having an oxirane group which is a three-member ring and include aromatic epoxy compounds and also alicyclic epoxy compounds.

General Formula (1)

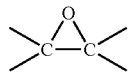

Oxetane compounds usable in the present invention refer to compounds having an oxetane ring which the four-membered ring ether represented by General Formula (2) below.

General Formula (2)

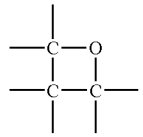

In the cationically polymerizable compositions of the present invention, preferred cationically polymerizable compounds are cyclic ethers which undergo ring-opening polymerization by the action of cations, but more preferred ones are alicyclic epoxy compounds and oxetane compounds. Specifically, it is preferable that alicyclic epoxy compounds and oxetane compounds are mixed before use. In this case, the mixing ratio (alicyclic epoxy compounds/oxetane compounds) of alicyclic epoxy compounds to oxetane compounds is 5/95-95/5 in terms of weight ratio. When the amount of oxetane compounds is excessively low, cured materials tend to result in lowered flexibility and lowered solvent resistance, while when the amount of oxetane compounds is excessively high, insufficient curing is caused.

In the cationically polymerizable compositions of the present invention, listed as preferred oxetane compounds are, for example, oxetanes such as 3-ethyl-3-hydroxymethyloxetane, 1,4-bis{[(3-ethyl-3-oxetanyl)methoxy]methyl}benzene, 3-ethyl-3-(phenoxymethyl)oxetane, 3-ethyl-3-(2-ethylhexycyclomethyl)oxetane, or di[1-ethyl(3-oxetanyl)]methyl ether.

Listed as preferred alicyclic epoxy compounds are, for example, alicyclic epoxy resins such as 3,4-epoxycyclohexylmethyl-3', 4'-epoxycyclohexane carboxylate (commercially available products such as trade names; VR6105, UVR61110 and CELLOXIDE 2021), bis (3,4-epoxycyclohexylmethyl)

adipate (a commercially available product such as trade name; UVR6128), vinylcyclohexane monoepoxide (a commercially available product such as a trade name of CELOXIDE 2000), ε-caprolactone modified 3,4-epoxycyclohexlmethyl-3', 4'-epoxycyclohexane carboxylate (commercially available products such as trade name of CELOXIDE E2081), 1-methyl-4-(2-methyloxiranyl)-7-oxabicyclo[4,1,0] heptane (a commercially available product such as trade name of CLOXIDE 3000). All the above products of trade names; UVR6105, UVR6110, and UVR6128 are available from Union Carbide Co., while all the above products CELOXIDE 2000, CELLOXIDE 2021, CELOXIDE 2081, and CELOXIDE 3000 are available from Daicel Chemical Industies, Ltd. Incidentally, UVR 6105 is equivalent to the lower viscosity product of UVR 6110.

Further, specific examples of other cationically polymerizable compounds are detailed in JP-A Nos. 8-143806, 8-283320, 2000-186079, and 2000-3427672. It is possible to select any of the compounds exemplified therein for use in the present invention.

Cationic polymerization initiators usable in the present invention, when applied to cationically polymerizable compositions, refer to those in which the total content of cationic compounds, metal compounds, and strong acidic compounds is commonly 1-500 ppm. However, depending on production methods of the cationically polymerizable composition of the present invention, it is possible to use cationic polymerization initiators capable of controlling the total content of cationic compounds, metal compounds, and string acidic compounds to be 1-500 ppm.

Other than sulfonium salts known in the art, listed as cationic polymerization initiators are diaryl iodonium salts and triaryl sulfonium salts. It is possible to appropriately select and use those described, for example, in JP-A Nos. 8-143806 and 8-283320. Further, it is possible to use commercially available products without any modification. Listed as representative examples of the commercially available products may, for example, be CI-1370, CI-2064, CI-2397, CI-2624, CI-2639, CI-2734, CI-2758, CI-2823, CI-2855, and CI-5102, all of which are trade names (produced by Nippon Soda Co., Ltd.), as well as PHOTOINITIATOR 2047, a trade name (produced by Rodia Co.), and UVI-6974 and UVI-6990, trade names (produced by Union Carbide Co.).

The used amount of cationic polymerization initiators in the cationically polymerizable compositions of the present invention varies depending on their type, the type of used cationically polymerizable compounds, the usage ratio, and usage conditions. In practice, it is commonly 0.1-20 parts by weight with respect to 100 parts by weight of the cationically polymerizable compounds in a cationically polymerizable composition, is preferably 1-10 parts by weight, but is more preferably 3-5 parts by weight. When the amount of cationic polymerization initiators exceeds the above range, polymerization proceeds quickly, but the resulting storage stability tends to degrade, while when it is below the above range, curability is degraded.

In the present invention, it is characterized that the total content of cationically polymerizable compounds, cationic compounds other than cationic polymerization initiators, metal compounds, and strong acidic compounds is 1-500 ppm, but it is preferably 10-100 ppm.

The above cationic compounds, metal compounds, and strong acidic compounds do not incorporate counter-anions in the same amount of the above cationic polymerization initiators.

These cationic compounds, metal compounds, and strong acidic compounds are brought with cationically polymerizable compounds, cationic polymerization initiators, or other additives during preparation of a cationically polymerizable composition. When these impurities exceed 500 ppm, the resulting storage stability, curing degree and ejecting stability are deteriorated. On the other hand, when these impurities are restrained under 1 ppm, it was fount that the resulting storage stability, curing degree and ejecting stability are also deteriorated.

Listed as above cationic compounds, metal compounds, and strong acidic compounds may be compounds incorporating elements such as B, F, Na, Mg, Al, P, S, Cl, K, Ca, Cu, Br, Ag, Sn, Sb, As, or W, or compounds incorporating the same.

Further listed as strong acidic compounds are, for example, sulfuric acid, hydrochloric acid, nitric cid, phosphoric acid, p-toluenesulfonic acid, benzenesulfonic acid, naphthalenesulfonic acid, methanesulfonic acid, ethanesulfonic acid, trifluoromethanesulfonic acid, $AlCl_3$, $AlBr_3$, $FeCl_3$, $BCl_3$, $BBr_3$, $BF_3.OEt_2$, $BF_3$, $SbF_5$, $PF_5$, $ZnCl_2$, and $TiCl_4$.

In the present invention, by applying a treatment utilizing separation and purification methods such as an adsorption treatment employing basic adsorbents, column chromatography, (such as silica gel chromatography), an active carbon treatment, crystallization or recrystallization, to any one of the cationically polymerizable compound, cationic polymerization initiator, and cationically polymerizable composition, it is possible to prepare cationically polymerizable compositions of the present invention in which the total amount of the cationic compounds, metal compounds and strong acidic compounds is 1-500 ppm.

Specifically, among the above purification methods, it is preferable that strong acidic compounds are subjected to the adsorption treatment employing basic adsorbents and separation treatment employing column chromatography. Employed as basic adsorbents may, for example, be basic inorganic adsorbents (for example, hydrotalcite) such as "KYOWARD", a trade name). The used amount of basic adsorbents may be suitably determined depending on the type of strong acidic compound and the content and is commonly 1-200 parts by weight with respect to 100 parts by weight of the compounds employed for treatments. The adsorption treatment, employing basic adsorbent, is performed by dissolving the compound to be treated in soluble solvents at a treatment temperature of, for example, about 10 - about 100° C. It is possible to conduct the treatment, employing common methods such as a batch system, a continuous system, a fluidized bed system, or a packed tower system.

Incidentally, it is possible to determine the content of these cationic compounds, metal compounds, and strong acidic compounds, employing conventional analytical methods such as high speed liquid chromatography, gas chromatography, element analysis, atomic absorption spectrometry, infrared spectroscopy, an NMR spectrum method, a mass spectrometry, or titrimetry. In view of detection of elements in an minute amount and accuracy, preferred are atomic absorption spectrometry, mass spectroscopy, and titration analysis.

In the present invention, the moisture content of the cationically polymerizable composition of the present invention varies depending on the type of cationically polymerizable compound and content ratio thereof, the types of cationic polymerization initiators and content ratio thereof, storage conditions, and curing conditions, and is preferably at least one percent by weight, but is more preferably at least two percent by weight. When the moisture content is insufficient, it is not possible to sufficiently enhance storage stability of cationically polymerizable compounds.

Further, in the present invention, it is not hindered to incorporate water in an excessively large amount into a cationically polymerizable composition, but it is preferable that the above water is dissolved in cationically polymerizable compounds. Accordingly, the upper limit of the water content is commonly determined by the water amount dissolved in cationically polymerizable composition, whereby it is generally not possible to specify the amount. In practice, the water content is commonly at most 10 percent by weight, is preferably at most 6 percent by weight, but is more preferably 4 percent by weight. The added amount of water is determined taking into account the consumed amount due to vaporization during storage and curing. When the content of water becomes excessively large, it takes long time to cure cationically polymerizable compounds and further water occasionally deposits at a relatively low temperature.

Further, in the present invention, it is preferable that water evaporation inhibiting agents are incorporated in cationically polymerizable compositions. Water incorporated in the cationically polymerizable compositions is lost via evaporation during storage, whereby the storage stability of the cationically polymerizable compositions tends to be lowered over an elapse of time. However, by the use of water evaporation inhibiting agents together with other additives, it is possible to maintain the storage stability of the cationically polymerizable compositions for an extended period of time due to minimization of water evaporation. Water evaporation inhibiting agents are preferably employed not only in the case in which the cationically polymerizable composition is stored in a sealed system but also in the case in which storage is performed in an open system as for ink vehicles. Employed as water evaporation inhibiting agents usable in the present invention may, for example, be substances such as ethylene glycol, triethylene glycol, dipropylene glycol, butylenes glycol, polyethylene glycol (of a molecular weight 200-600), glycerin, sorbitol, sodium lactate, sodium 2-pyrrolidone-5-carboxylate, sodium hyaluronate, other alcohols, saccharides, or glycol ethers, which exhibit the desired moisture retention capability.

The used amount of water evaporation inhibiting agents according to an embodiment of the present invention may be appropriately controlled based on the types of cationically polymerizable compounds, the types of water evaporation inhibiting agents, the storage state, and the desired storage period, and is commonly 10-200 percent by weight with respect to water incorporated in the cationically polymerizable composition, but is more preferably 50-100 percent by weight.

It is possible to appropriately control the viscosity of the cationically polymerizable compositions of the present invention depending on its use by selecting the molecular weight of cationically polymerizable compounds or a combination thereof. Specifically, in cases in which the cationically polymerizable composition of the present invention is employed as a vehicle for ultraviolet radiation curable ink for office use ink-jet printers, the viscosity is commonly controlled to be 5-50 mPa·s, but preferably to be 10-30 mPa·s.

It is possible to cure the cationically curable compositions of the present invention, employing a conventional method in which a polymerization reaction is initiated using actinic radiation such as ultraviolet rays, X-rays, electron beams or heating. Incidentally, if desired, it is possible to incorporate various types of additives such as pigments, dyes, sensitizers, fire retardants, and antistatic agents into the cationically polymerizable compositions of the present invention, which are suitably employed, for example, as ink, vehicle, glazing varnish, paint, adhesive, prepreg, sealing material, laminate, and molding compositions.

EXAMPLES

The present invention will now be described with reference to examples, however the present invention is not limited thereto.

<<Synthesis of Cationic Polymerization Initiators>>

(Synthesis of Exemplified Compound 1-1)

Charged into a 500 ml four-necked flask was 20 ml of tin tetrachloride and then while stirring, 48.1 g of anisole was added. The resulting solution was cooled in iced water, and while maintaining the temperature in the range of 10-15° C., 6.75 g of thionyl chloride was dripped. During this operation, the reactants became dark brown. While stirring, the reactants were allowed to stand at room temperature over 4 hours. Thereafter, 70 ml of water was added to the reactants. Subsequently, the resulting oil layer was collected and washed with diethyl ether three times, and an aqueous solution prepared by dissolving 18.4 g of $KPF_6$ in 100 g of water was added and the resulting mixture was allowed to stand over a whole day and night. The resulting oil layer was collected, washed with diethyl ether, and dried under vacuum, whereby 32.3 g (at a yield of 59.6 percent) of tris(4-methoxyphenyl) sulfonium hexafluorophosphate, Exemplified Compound 1-1, was obtained in the form of a white powder. The structure of resulting Exemplified Compound 1-1 was identified utilizing infrared absorption spectra, element analysis and NMR.

(Synthesis of Exemplified Compound 1-2)

Above Exemplified Compound 1-1 was dissolved in methylene chloride. The resulting solution was passed through an alumina column and while stirring, blended with an aqueous sodium carbonate solution. Thereafter, the resulting methylene chloride layer was collected and dehydrated employing magnesium sulfate. Methylene chloride was removed via drying and recrystallization was performed employing methanol, whereby Exemplified Compound 1-2, prepared by applying the basic treatment to Exemplified Compound 1-1, was obtained in the form of a white powder.

(Synthesis of Exemplified Compound 2-1)

Charged into a 1,000 ml three-necked flask was 300 g of sulfuric acid, and while stirring, 47.7 g of 4,4'-difluorodiphenyl sulfide was added. After confirming that the 4,4'-difluorodiphenyl sulfide was completely dissolved, 65.0 g of 3-chloro-4-phenylthio-benzophenone was divided into 5 parts and subsequently added in five steps. During this procedure, the reactants became dark brown immediately after the addition. While stirring, the reactants were allowed to stand at room temperature for 24 hours, and then charged into a 3,000 ml beaker incorporating 500 g of ice and 500 g of methanol, and 300 g of toluene was added. The lower layer portion of the resulting solution was collected and neutralized by the addition of a 40 percent aqueous sodium hydroxide solution. Thereafter, 1,500 g of ethyl acetate was added while stirring. Subsequently, 44.2 g of $KSbF_6$ was added and then the resulting mixture was stirred for two hours. The resulting ethyl acetate layer was washed twice with 1,000 g of water and concentrated under vacuum, whereby 139 g (at a yield of 89 percent) of 4-(2-chloro-4-benzoylphenylthio)phenylbis(4-fluorophenyl)sulfonium hexafluorophosphate, Exemplified Compound 2-1, was obtained in the form of a white powder. Incidentally, the structure of resulting Exemplified Compound 2-1 was identified utilizing infrared absorption spectra, element analysis and NMR.

(Synthesis of Exemplified Compound 2-2)

Exemplified Compound 2-1, prepared as above, was subjected to a basic treatment in the same manner as above Exemplified Compound 1-2, whereby Exemplified Compound 2-2 was obtained in the form of white powder.

(Synthesis of Exemplified Compound 3-1)

Charged into a 500 ml three-necked flask were 31.71 g (0.33 mol) of methanesulfonic acid and 3.41 g (0.024 mol) of phosphorous pentaoxide. The resulting mixture was stirred for 3 hours at 70° C. and the resulting uniform solution was cooled to room temperature. Added to the resulting solution were 7.86 g (0.033 mol) of 4,4'-difluorodiphenyl sulfoxide and 3.07 g (0.0165 mol) of diphenyl sulfide, and stirred for 5 hours at room temperature. While stirring, the resulting reacted mixture was gradually dripped into 380 ml (0.0333 mol) of a 3 percent aqueous sodium tetraphenylborate, and stirring was continued for three hours at room temperature. Deposited solids were collected by filtration, dried, and then dissolved in isopropanol upon being heated (at 70° C.), subsequently cooled to 0° C., collected by filtration and dried, whereby 14.18 g (0.0112 mol) of [4-(4-fluoro)diphenylsulfonylphenyl]sulfide bis(hexafluorophosphate), Exemplified Compound 3-1 in the form of white solids was obtained. Incidentally, the structure of resulting Exemplified Compound 3-1 was identified utilizing infrared absorption spectra, element analysis and NMR.

(Synthesis of Exemplified Compound 3-2)

Exemplified Compound 3-1, prepared as above, was subjected to a basic treatment in the same manner as the synthesis of above Exemplified Compound 1-2, whereby Exemplified Compound 3-2 was obtained in the form of white solids.

<<Preparation of Cationically Polymerizable Compositions>>

(Cationically Polymerizable Compositions 1-3: Present Invention)

As shown in Table 1, charged into a stainless steel beaker were two parts by weight of a dispersing agent (S32000), an alicyclic epoxy compound, an oxetane compound, a cationic polymerization initiator (Exemplified Compound 1-2, 2-2, or 3-2). While stirring, the resulting mixture was blended and dissolved over one hour upon being heated on a hot plate at 65° C. Subsequently, pigment (P1) was added to the resulting solution in the amount described in Table 1. The resulting mixture was sealed in a plastic bottle together with 200 g of 1 mm diameter zirconia beads and was subjected to dispersion for two hours, employing a paint shaker. Subsequently, the zirconia beads were removed, and after adding various types of residual additives, the resulting mixture was filtered by a 0.8 μm membrane filter, whereby Cationically Polymerizable Compositions 1-3 were prepared.

(Preparation of Cationically Polymerizable Compositions 4-6: Comparative Examples)

Cationically Polymerizable Compositions 4-6 were prepared in the same manner as above Cationically Polymerizable Compositions 1-3, except that each of Exemplified Compounds 1-2, 2-2, and 3-2 which were cationic polymerization initiators having been subjected to a basic treatments was replaced with each of Exemplified Compounds 1-1, 2-1, and 3-1 which had not been subjected to any treatment.

(Preparation of Cationically Polymerizable Composition 7: Present Invention)

Sodium carbonate powders were suspended in Cationically Polymerizable Composition 4 prepared as above, and after stirring for one hour, sodium carbonate was removed by filtration employing a filter, whereby Cationically Polymerizable Composition 7, which was subjected to a purification treatment was prepared.

Incidentally, each of the additives represented as alphanumeric codes in Table 1 will now be detailed below.

UVR6105: 3,4-epoxycyclohexylmethyl-3', 4'-epoxycyclohexane carboxylate (trade name; OXT221, being an alicyclic epoxy compound, produced by Union Carbide Co., Ltd.)

OXT211: di[1-ethyl(3-oxetanyl)) methyl ether (trade name; OXT221, being an oxetane compound, produced by Toagosei Chemical Industry Co., Ltd.)

TEG: triethylene glycol

Pigment P1: Charged into a 3.79 L (one gallon) styrene kneader (produced by Inoue Manufacturing Co., Ltd.) were 250 parts of crude copper phthalocyanine (copper phthalocyanine, produced by Toyo Ink Mfg. Co., Ltd.), 2,500 parts of sodium chloride and 160 parts of polyethylene glycol (POLYETHYLENE GLYCOL 300, produced by Tokyo Kasei Kogyo Co., Ltd.), and the resulting mixtures was kneaded for three hours. Subsequently, the resulting mixture was charged into 2.5 L of heated water and the resulting mixture was stirred for about one hour at about 80° C., to form a slurry employing a high speed mixer. Thereafter, sodium chloride and solvents were removed by filtering and washing the resulting slurry five times, and was then subjected to spray drying, whereby Pigment P1 which was subjected to a dispersion treatment was prepared.

S3200: pigment dispersing agent (aliphatic modification based dispersing agent, SOLSPERSE 32000, produced by Zeneca Co.)

<<Determination and Evaluation of Characteristic Values of Cationically Polymerizable Compositions>>

(Determination of Viscosity)

The viscosity of each of the cationically polymerizable compositions prepared as above was determined under conditions of 23° C. and a shear rate of 1,000 (1/s), employing REOMETER MCR300 (produced by Physica). As a result, all the cationically polymerizable compositions exhibited a viscosity in the range of 25-27 mPa·s.

(Determination of Water Content)

Immediately after preparing each of the above cationically polymerizable compositions, the water content (the amount of water in the entire composition in percent by weight) was determined employing the Karl Fischer technique (automatic moisture meter AQV-2000, produced by Hiranuma Sangyo Co., Ltd.). The results showed that the water content of all the cationically polymerizable compositions was in the range of 3.5-4.0 percent by weight.

(Determination of Total Amount of Cationic Compounds, Metal Compounds, and Strong Acidic Compounds)

The total amount (in ppm) of cationic compounds, metal compounds, and strong acidic compounds of each of the above cationically polymerizable compositions was determined employing atomic absorption spectrometry, mass spectroscopy, and titrimetry. Incidentally, detected as constituting elements of the cationic compounds, metal compounds, and strong acidic compounds were Sn, Sb, Cl, S, K, P, Mg, P, B, Na, F, HCl, HPF$_6$, KSbF$_6$, phosphoric acid, methanesulfonic acid.

(Evaluation of Storage Stability)

After charging each of the cationically polymerizable compositions prepared as above into two glass vessels, accelerated aging was performed for one week at an ambience in which the temperature was maintained at approximately 70° C. in the state in which the glass vessel was sealed with a lid (hereinafter referred to a sealed system) and the glass vessel was not sealed with a lid (hereinafter referred to as an open system). Thereafter, the state of each of the resulting cationically polymerizable compositions was visually observed, and storage stability was evaluated based on the criteria below.

A: in both the sealed and open systems, no gelling of the cationically polymerizable composition was noted
B: in the open system, slight gelling of the open system was noted, while in the sealed system, no gelling of the same was noted
C: in both the sealed and open systems, gelling of the cationically polymerizable composition was clearly noted (Evaluation of Curability)

Each of the cationically polymerizable compositions was applied onto one side surface of a 100 μm thick polyethylene terephthalate film employing a wire bar coating method, whereby a thin 10 μm coating was formed. The resulting film passed under the light source of a high pressure mercury lamp, and was cured through an exposure to the ultraviolet radiation. During this operation, the exposed energy of ultraviolet radiation of the high pressured mercury lamp was varied and the amount (in $mJ/cm^2$) of exposed ultraviolet radiation energy, until no tackiness was felt by fingers, was determined, and the resulting amount of radiation was utilized as a scale of curability, in which a lower value implies higher curability.

(Evaluation of Ejection Stability)

Each of the cationically polymerizable compositions was continually ejected over 30 minutes from the recording heads of an ink-jet printer, produced by Xaar Co. The ejection state of each recording head was visually observed, and ejection stability was evaluated based in the criteria below.

A: 30-minute continual ejection resulted in no ejection nozzle
B: 30-minute continual ejection resulted in no ejection nozzle, but slight satellites were formed
C: 30-minute continual ejection resulted in no ejection at several nozzles Each of the measurement results obtained as above, except for the viscosity and water content, are shown in Table 2.

TABLE 1

| Cationically Polymerizable Composition No. | Cationically Polymerizable Compound | | Cationic Polymerization Initiator | | Other Additives (parts by weight) | | | |
|---|---|---|---|---|---|---|---|---|
| | UVR6105 (parts by weight) | OXT221 (parts by weight) | Exemlified Compound | Added Amount (part by weight) | TEG | Pure Water | Pigment P1 | S32000 |
| 1 | 25 | 75 | 1-2 | 10 | 0.2 | 4.0 | 5.0 | 2.0 |
| 2 | 25 | 75 | 2-2 | 10 | 0.2 | 4.0 | 5.0 | 2.0 |
| 3 | 25 | 75 | 3-2 | 10 | 0.2 | 4.0 | 5.0 | 2.0 |
| 4 | 25 | 75 | 1-1 | 10 | 0.2 | 4.0 | 5.0 | 2.0 |
| 5 | 25 | 75 | 2-1 | 10 | 0.2 | 4.0 | 5.0 | 2.0 |
| 6 | 25 | 75 | 3-1 | 10 | 0.2 | 4.0 | 5.0 | 2.0 |
| 7 | 25 | 75 | 1-1 | 10 | 0.2 | 4.0 | 5.0 | 2.0 |

TABLE 2

| Cationically Polymerizable Composition No. | Detected Cationic Compound, Metal Compound, Strong Acidic Compound, and Constituting Element (atomic absorption spectrometry, mass spectroscopy, and titrimetry) | Total Amount of Cationic Compound, Metal Compound, and Strong Acidic Compound (ppm) | Storage Stability | Curability (mj/$cm^2$) | Ejection Stability | Remarks |
|---|---|---|---|---|---|---|
| 1 | Sn, Cl, S, K, P, and F | 50 | A | 50 | A | Inv. |
| 2 | Sb, K, Na, and F | 50 | A | 50 | A | Inv. |
| 3 | P, B, Na, and F | 40 | A | 50 | A | Inv. |
| 4 | Sn, Cl, S, K, P, F, HCl, and $HPF_6$ | 1000 | B | 100 | B | Comp. |
| 5 | Sb, K, Na, F, and $KsbF_6$ | 1000 | B | 100 | B | Comp. |
| 6 | P, B, Na, F, phosphoric acid, and methanesulfonic acid | 800 | B | 100 | B | Comp. |
| 7 | Sn, Cl, S, K, P, and F | 40 | A | 50 | A | Inv. |

Inv.: Present Invention
Comp.: Comparative Example

As can clearly be seen from the results of Tables 1 and 2, the cationically polymerizable compositions of the present invention, in which the total content of the cationic compounds, metal compounds, and strong acidic compounds was 1-500 ppm, exhibited excellent storage stability, curability, and ejection stability compared to the comparative examples.

Further, the cationically polymerizable compositions of the present invention were subjected to a skin irritant patch test employing a rabbit's skin, whereby it was confirmed that none of the above polymerizable compositions caused a toxic reaction.

While the preferred embodiments of the present invention have been described using specific terms, such description is for illustrative purposes only, and it is to be understood that changes and variations may be made without departing from the spirit or scope of the appended claims.

What is claimed is:

1. A cationically polymerizable composition comprising a cationically polymerizable compound and a cationic polymerization initiator, wherein a total content of a cationic compound, a metal compound and a strong acid compound contained in the cationically polymerizable composition is in the range of 1 to 500 ppm by weight based on the total weight of the cationically polymerizable composition;
   wherein each of the cationic compound, the metal compound and the strong acid compound contains an element selected from the group consisting of B, F, Na, Mg, Al, P, S, Cl, K, Ca, Cu, Br, Ag, Sn, Sb, As and W.

2. The cationically polymerizable composition of claim 1, wherein the total content of a cationic compound, a metal compound and a strong acid compound contained in the cationically polymerizable composition is in the range of 10 to 100 ppm by weight based on the total weight of the cationically polymerizable composition.

3. The cationically polymerizable composition of claim 1, wherein the cationically polymerizable compound is a alicyclic epoxy compound or an oxetane compound.

4. The cationically polymerizable composition of claim 1, further containing water in an amount of 1 to 10 weight % based on the total weight of the cationically polymerizable composition.

5. The cationically polymerizable composition of claim 1, further containing a water evaporation inhibiting agent.

6. The cationically polymerizable composition of claim 1, wherein a viscosity of the cationically polymerizable composition is 5 to 50 mPa·s at 23° C.

7. An actinic radiation curable ink-jet ink comprising the cationically polymerizable composition of claim 1.

8. A method of producing the cationically polymerizable composition of claim 1 comprising the steps of:
   mixing a cationically polymerizable compound and a cationic polymerization initiator to obtain a mixture which contains a strong acid compound as an impurity; and
   allowing the mixture to an adsorption treatment using an basic adsorbent so as to control a content of the strong acid compound in the range of 1 to 500 ppm by weight based on the total weight of the mixture.

* * * * *